Figure 1:
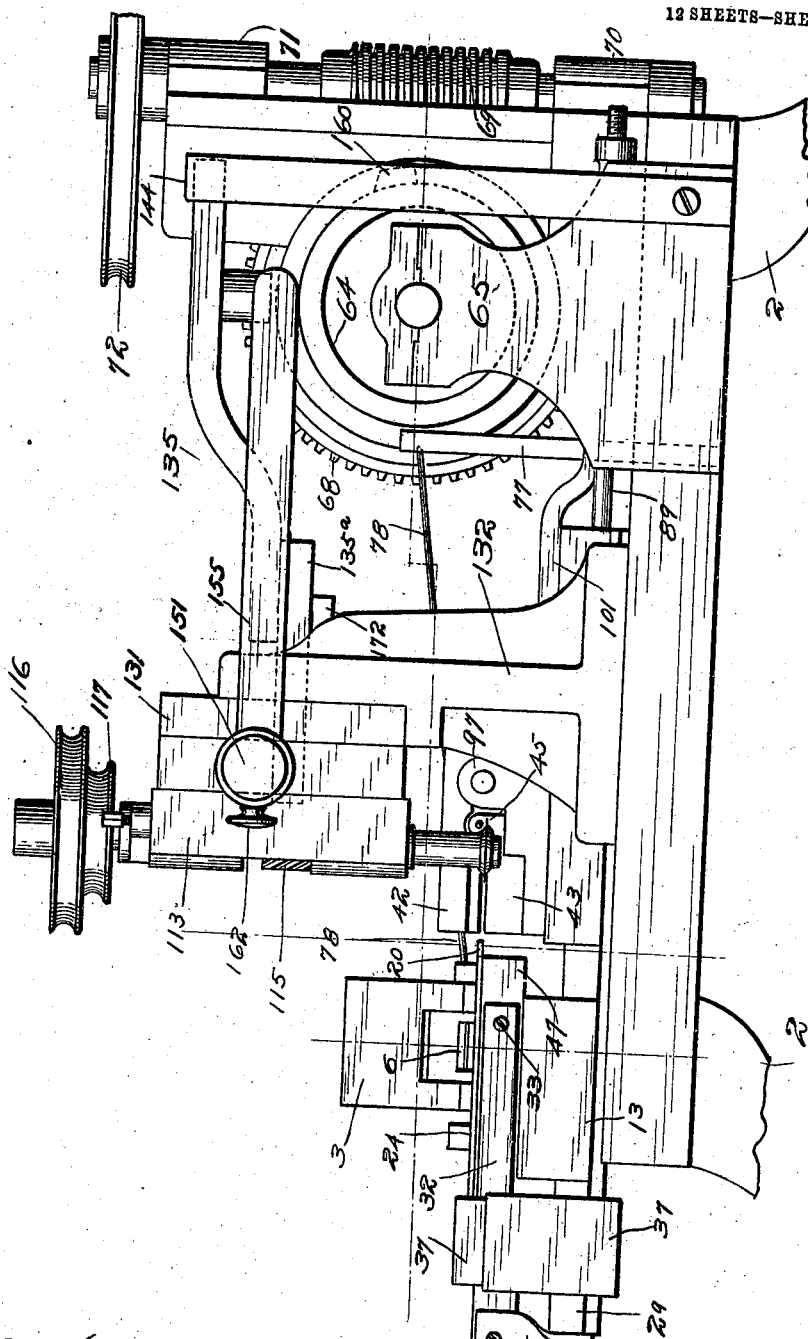

No. 847,686. PATENTED MAR. 19, 1907.
J. O. PETTEY.
MACHINE FOR GROOVING NEEDLES.
APPLICATION FILED JUNE 16, 1904.

12 SHEETS—SHEET 4.

Witnesses:
JBWein
[signature]

Inventor:
Jno. O. Pettey
by Elliott & Hopkins
attys

THE NORRIS PETERS CO., WASHINGTON, D. C.

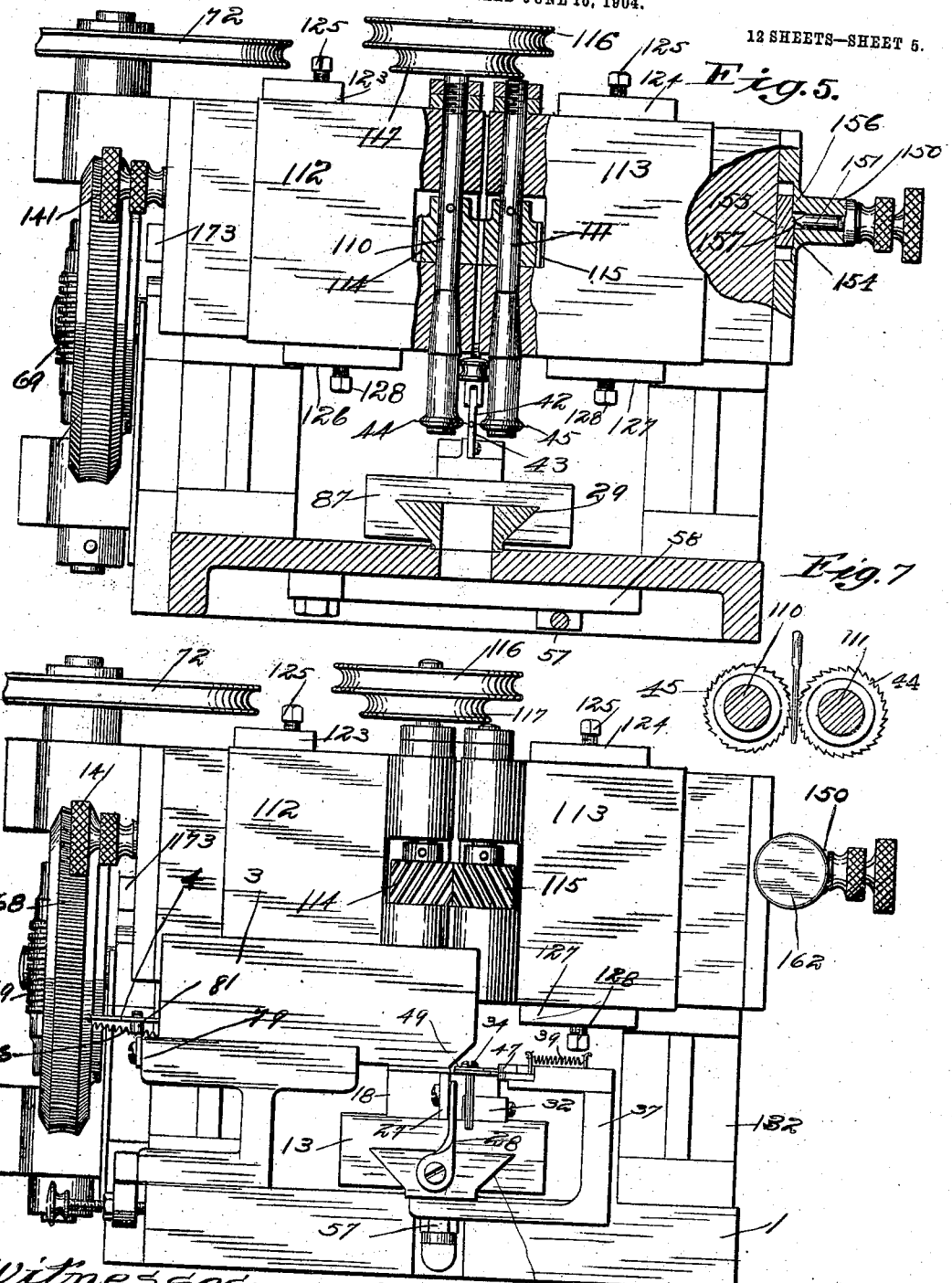

No. 847,686. PATENTED MAR. 19, 1907.
J. O. PETTEY.
MACHINE FOR GROOVING NEEDLES.
APPLICATION FILED JUNE 16, 1904.

12 SHEETS—SHEET 6.

Witnesses:
J B Weir

Inventor
Jno. O. Pettey
by Elliott + Hopkins
Attys

No. 847,686.
PATENTED MAR. 19, 1907.
J. O. PETTEY.
MACHINE FOR GROOVING NEEDLES.
APPLICATION FILED JUNE 16, 1904.
12 SHEETS—SHEET 7.
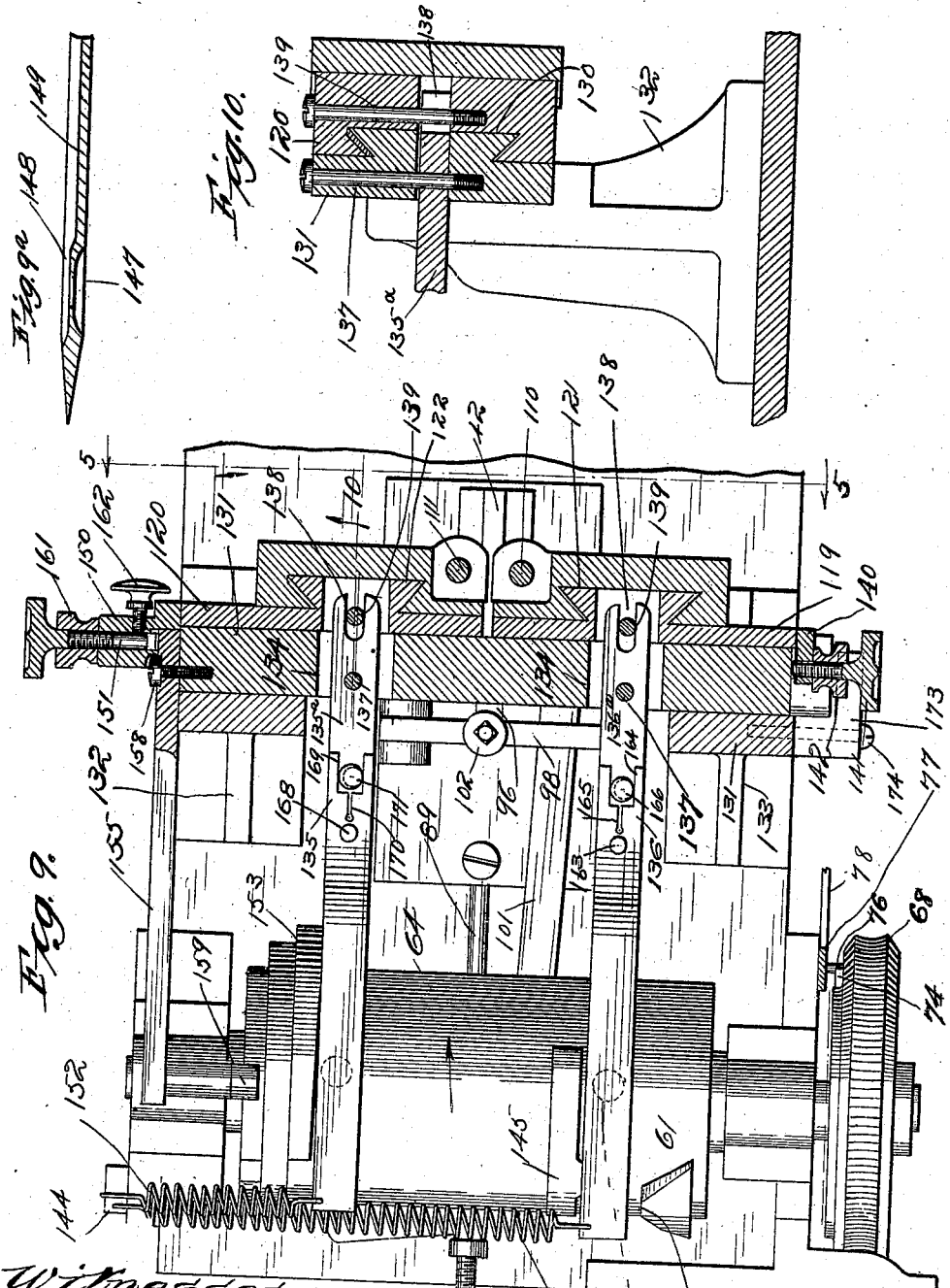

No. 847,686. PATENTED MAR. 19, 1907.
J. O. PETTEY.
MACHINE FOR GROOVING NEEDLES.
APPLICATION FILED JUNE 16, 1904.
12 SHEETS—SHEET 8.
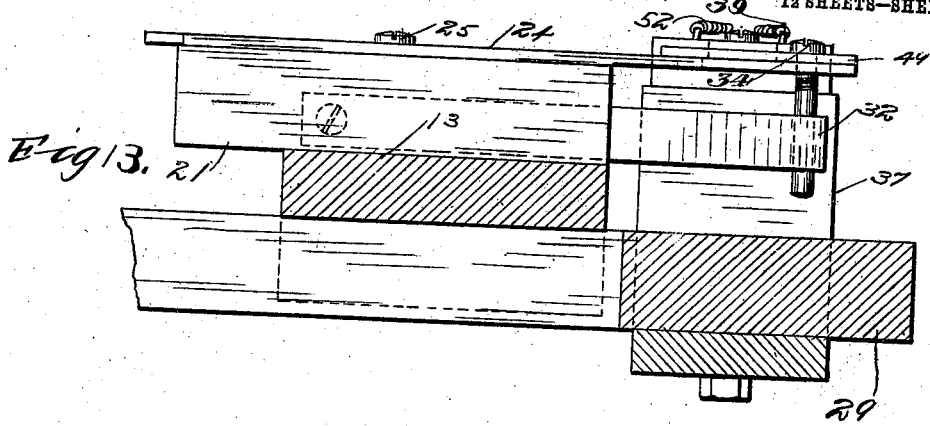
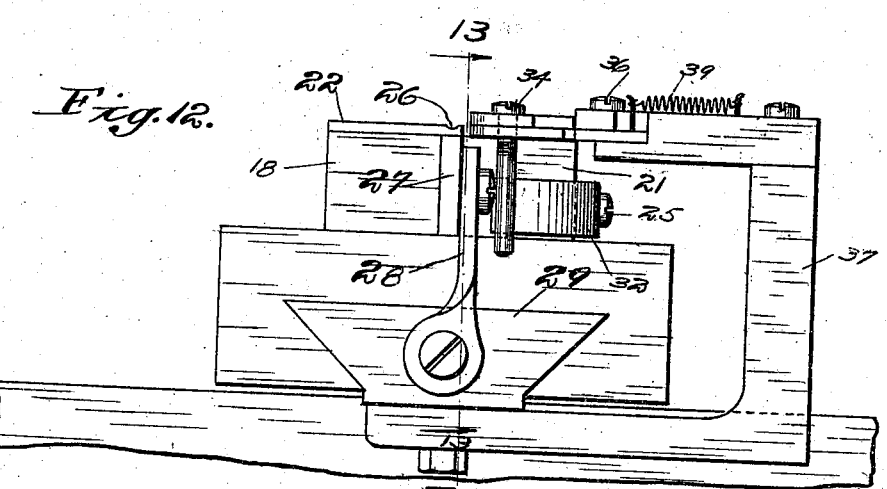
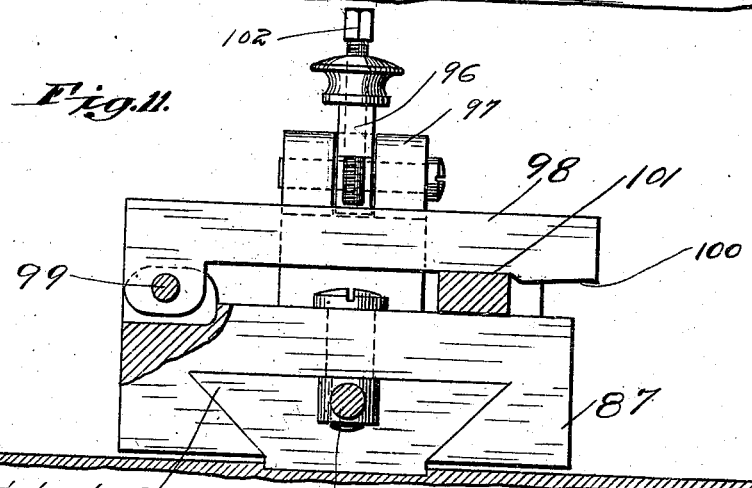
Witnesses:
JB Weir
Inventor:
Jno. O. Pettey
by Elliott & Hopkins
Attys No. 847,686. PATENTED MAR. 19, 1907.
J. O. PETTEY.
MACHINE FOR GROOVING NEEDLES.
APPLICATION FILED JUNE 16, 1904.
12 SHEETS—SHEET 9.
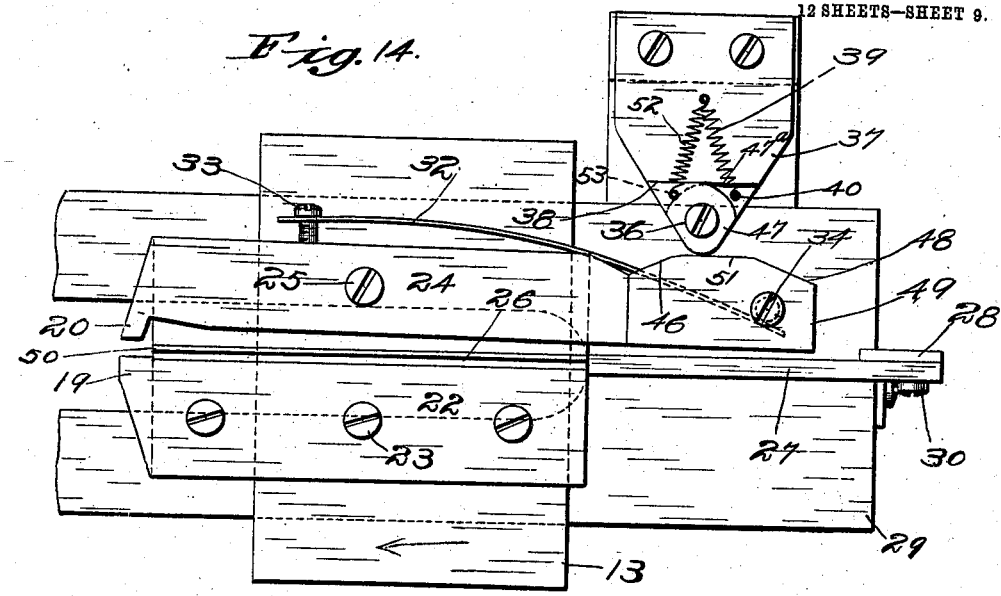
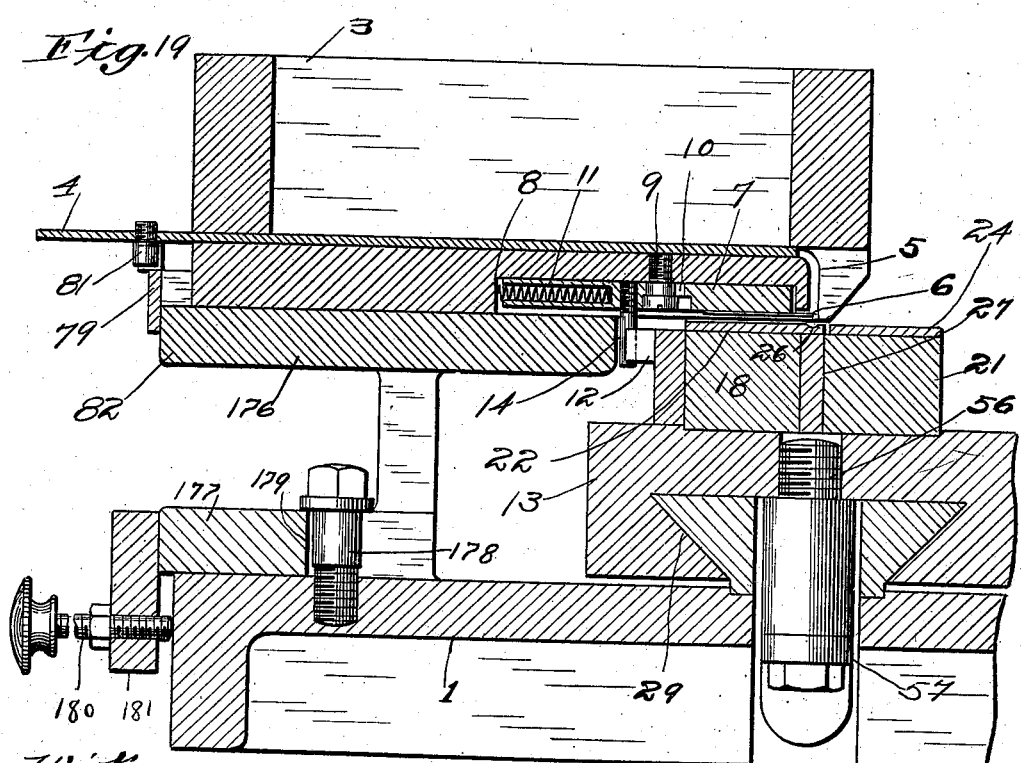

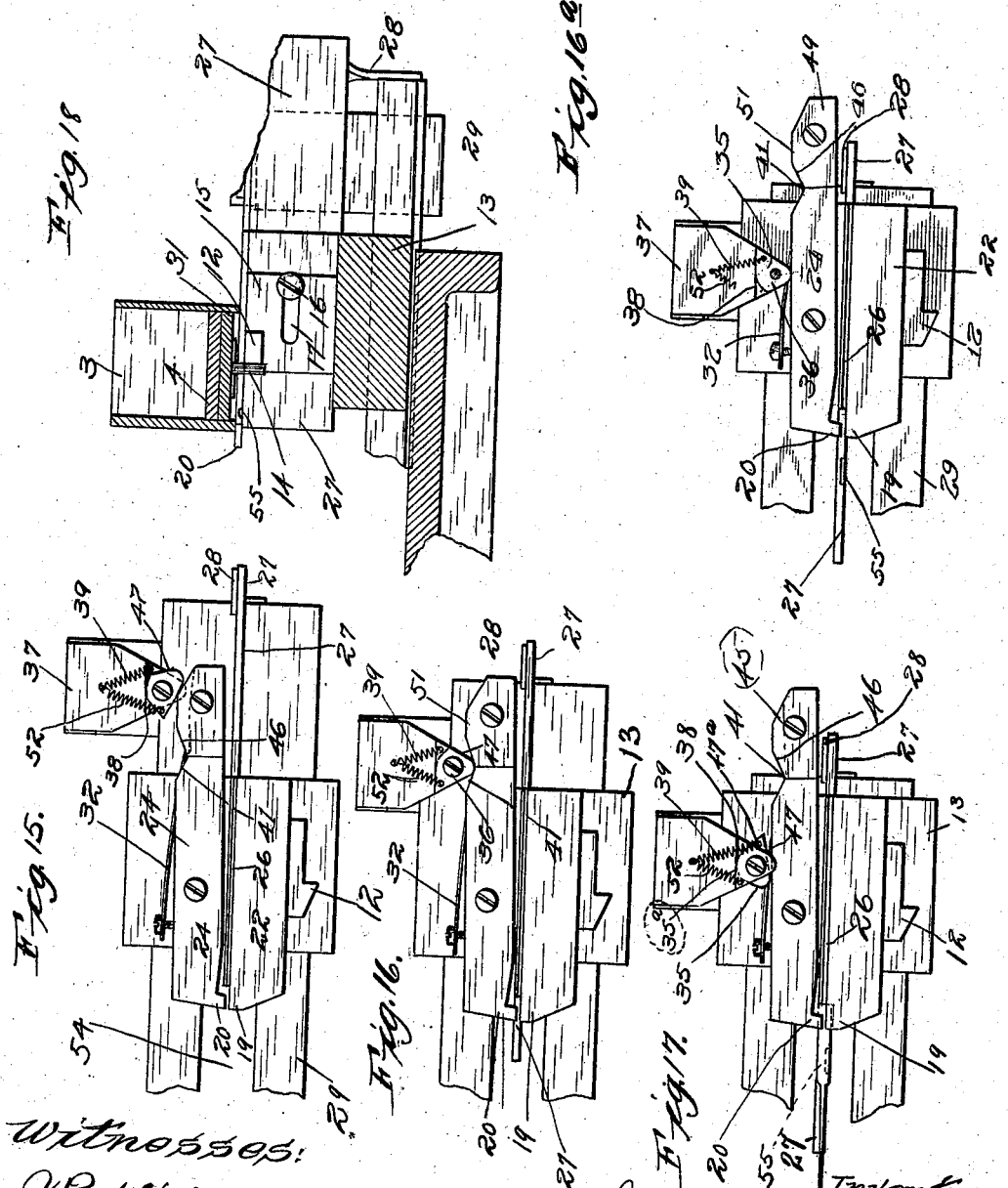

No. 847,686. PATENTED MAR. 19, 1907.
J. O. PETTEY.
MACHINE FOR GROOVING NEEDLES.
APPLICATION FILED JUNE 16, 1904.

12 SHEETS—SHEET 11.

Witnesses:
J B Weir

Inventor:
Jno. O. Pettey
by Elliott + Hopkins
Attys

No. 847,686. PATENTED MAR. 19, 1907.
J. O. PETTEY.
MACHINE FOR GROOVING NEEDLES.
APPLICATION FILED JUNE 16, 1904.

12 SHEETS—SHEET 12.

UNITED STATES PATENT OFFICE.

JOHN O. PETTEY, OF BELVIDERE, ILLINOIS, ASSIGNOR TO NATIONAL SEWING MACHINE CO., OF BELVIDERE, ILLINOIS, A CORPORATION OF ILLINOIS.

MACHINE FOR GROOVING NEEDLES.

No. 847,686.  Specification of Letters Patent.  Patented March 19, 1907.

Application filed June 16, 1904. Serial No. 212,751.

*To all whom it may concern:*

Be it known that I, JOHN O. PETTEY, a citizen of the United States, residing at Belvidere, in the county of Boone and State of Illinois, have invented certain new and useful Improvements in Machines for Grooving Needles, of which the following is a full, clear, and exact specification.

My invention relates to that class of needle-grooving machines in which the grooves are cut in opposite sides of the needle simultaneously by two revolving saws, milling-wheels, or other suitable cutters which are automatically held up to their work or forced into the needle a distance equal to the depth of the groove while being rotated and while the needle is being drawn past them. The cutters for accomplishing this work are necessarily delicate, owing to the narrowness of the groove and the slight extent to which it sinks into the needle, and consequently the mechanism for thus sinking the cutters into the needle while necessarily strong and durable must be capable of fine adjustment and great nicety of operation, so as to avoid any possibility of forcing the cutters too far, which would damage both the needle and the cutters and of not forcing them far enough, which would result in a groove of inadequate depth.

One of the important objects of my invention is to provide a positive and rigid stop, but one which is capable of adjustment for limiting the depth of the cut and to advance the cutters into the work by a yielding force instead of by a cam or other like rigid means.

Another object of the invention is to relieve the cams of the wear heretofore incident to holding the needle-grooving means or cutters up to their work.

Another object of my invention is to provide an improved and simple needle-jaw mechanism for placing the needles between and removing them from the cutters.

With these ends in view my invention consists in certain features of novelty in construction, combination, and arrangement of parts by which the said objects and certain other objects hereinafter appearing are attained, all as fully described with reference to the accompanying drawings, and more particularly pointed out in the claims.

Figure 2:
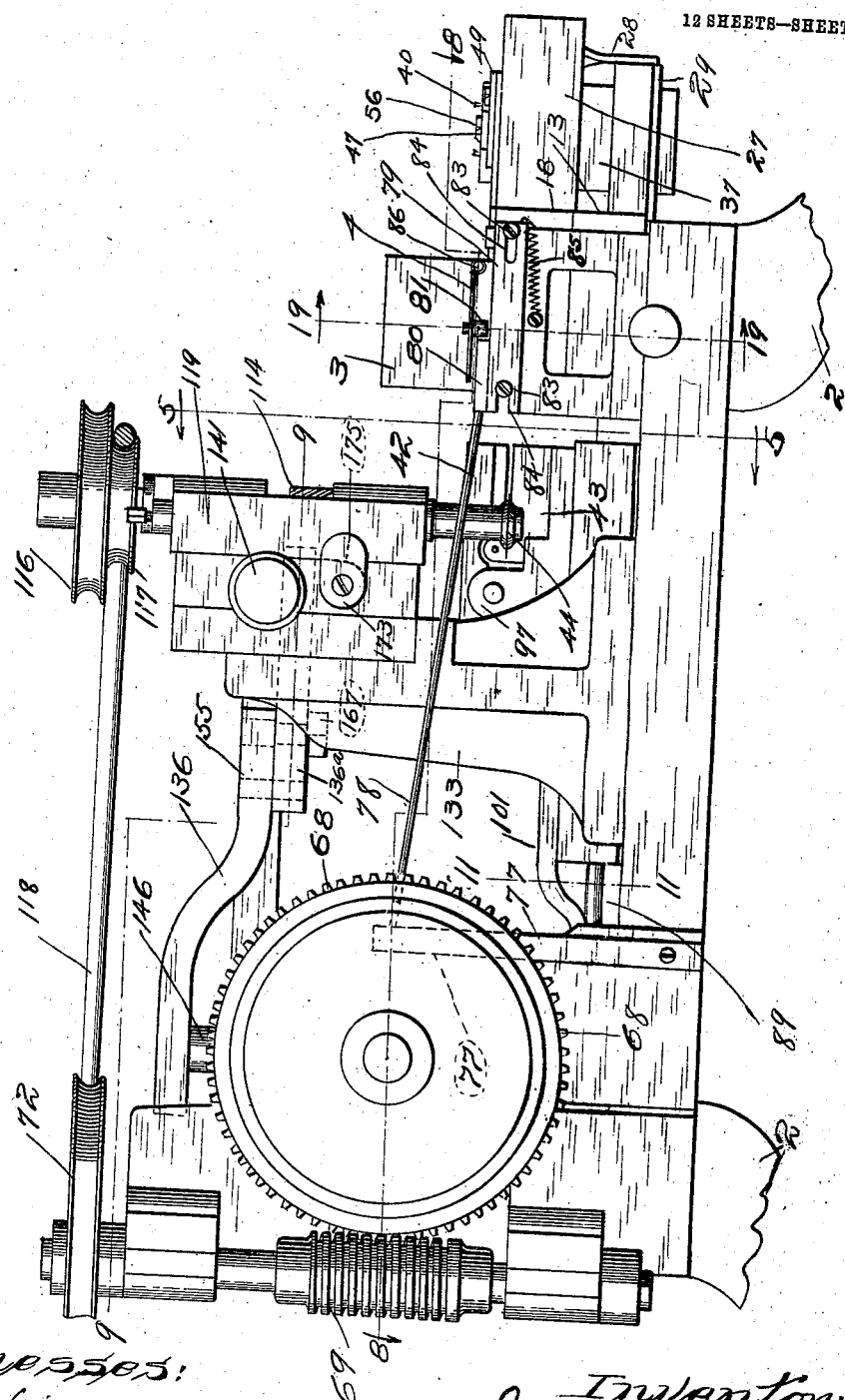
Figure 3:
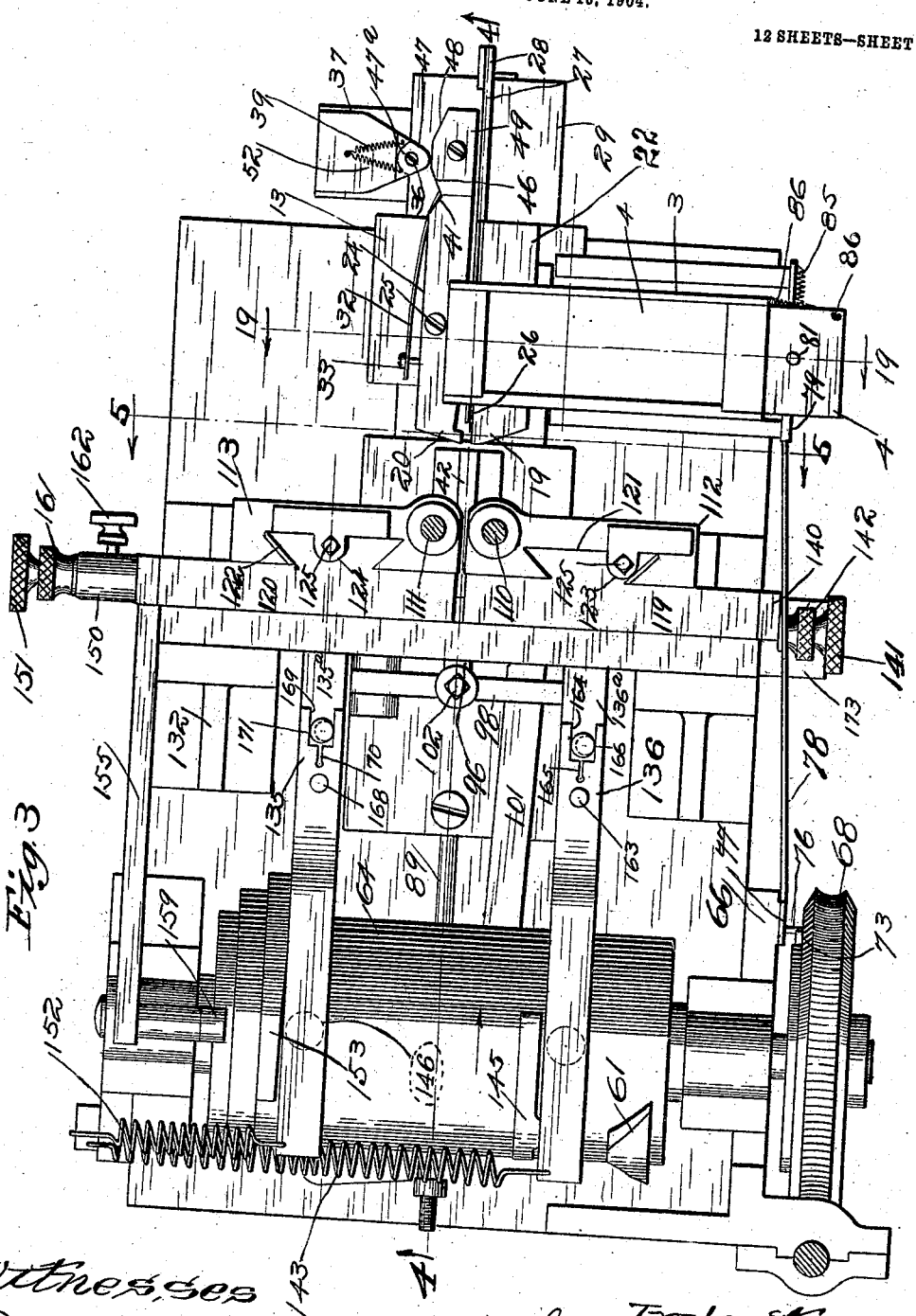
Figure 4:
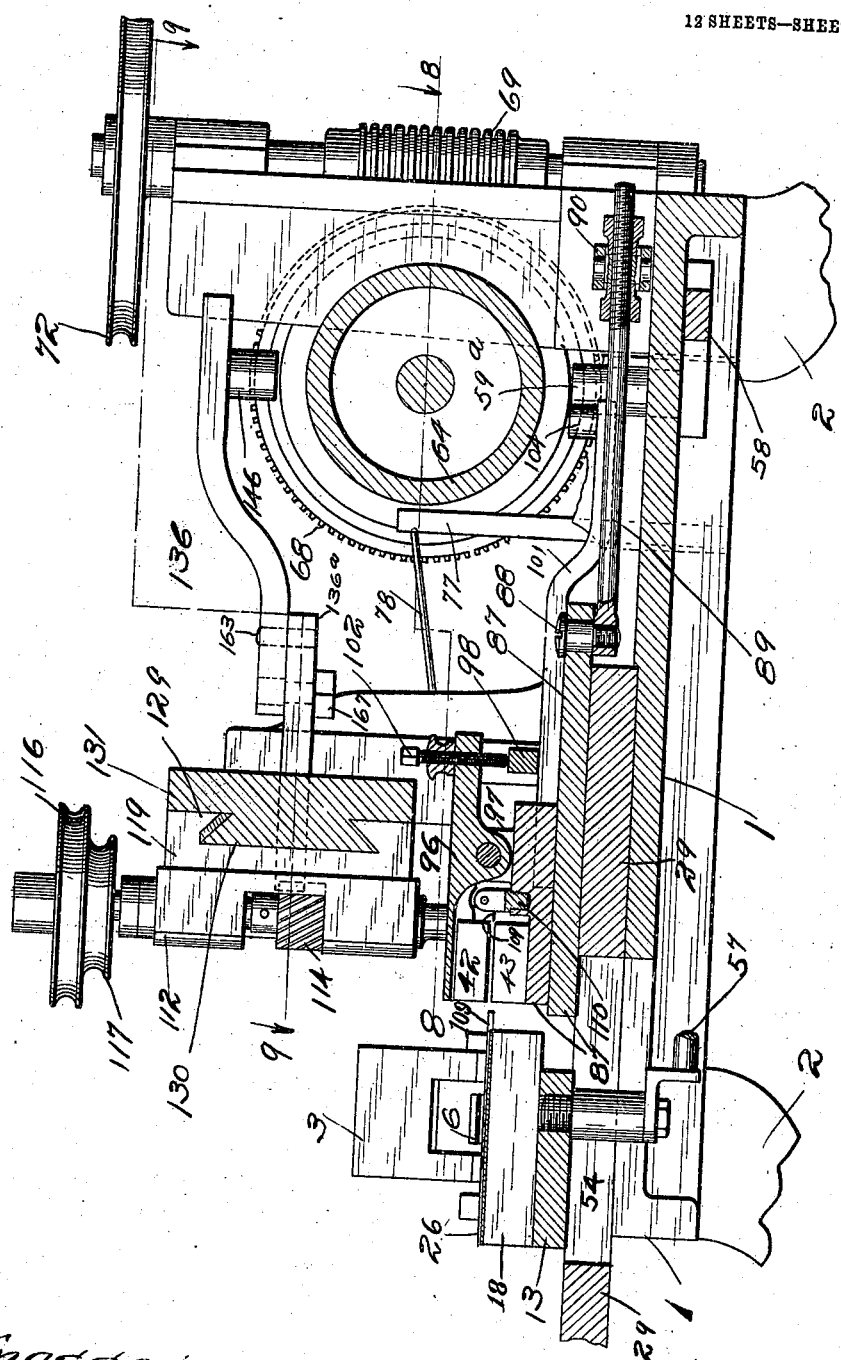
Figure 8:
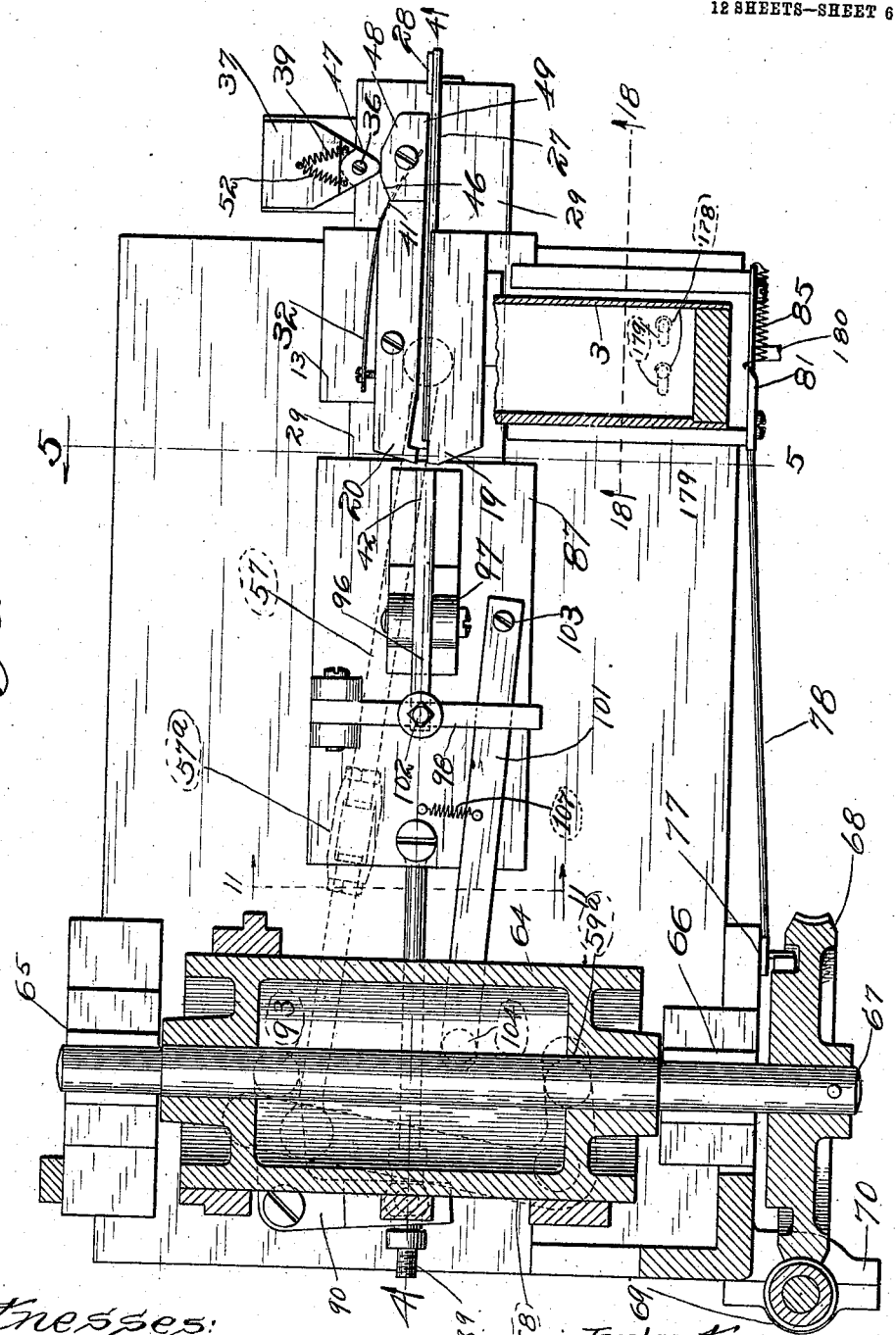
Figure 20:
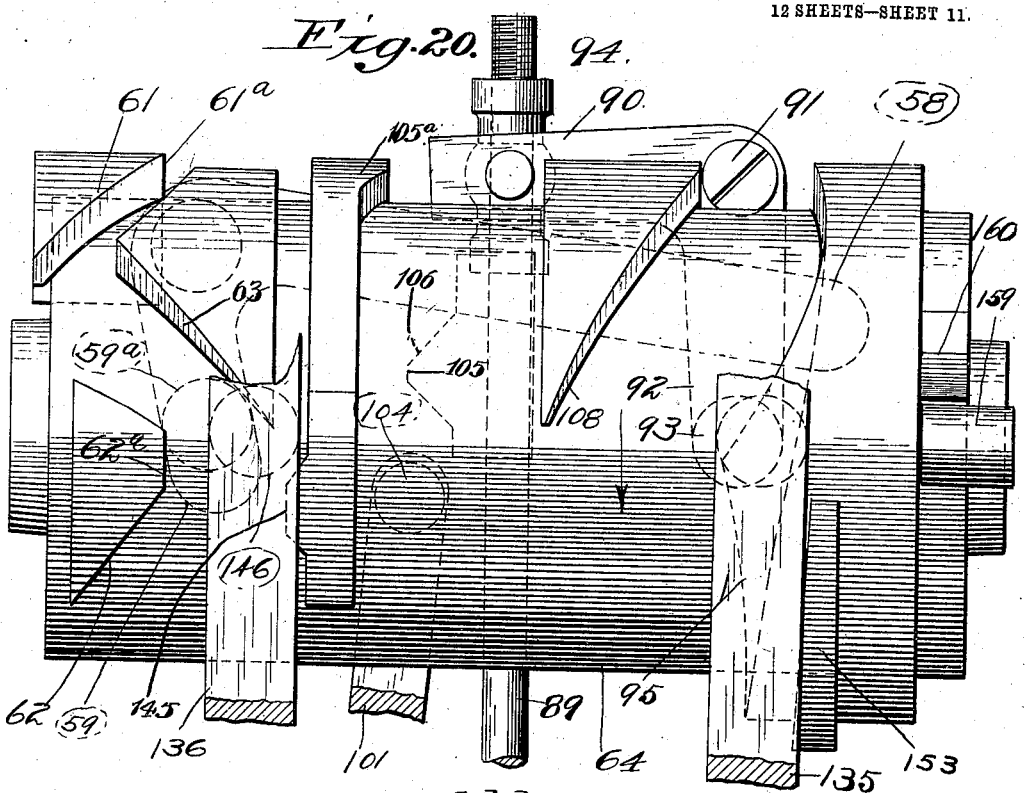
Figure 21:
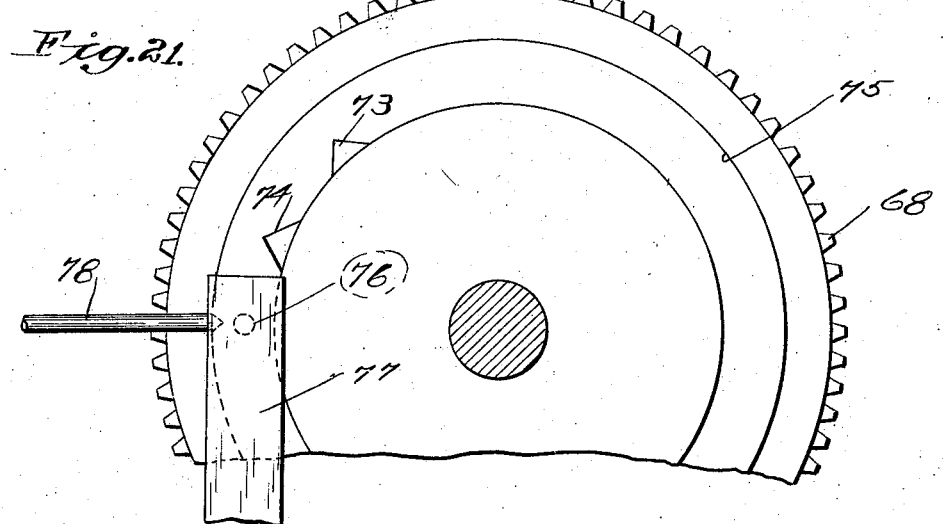
Figure 22:
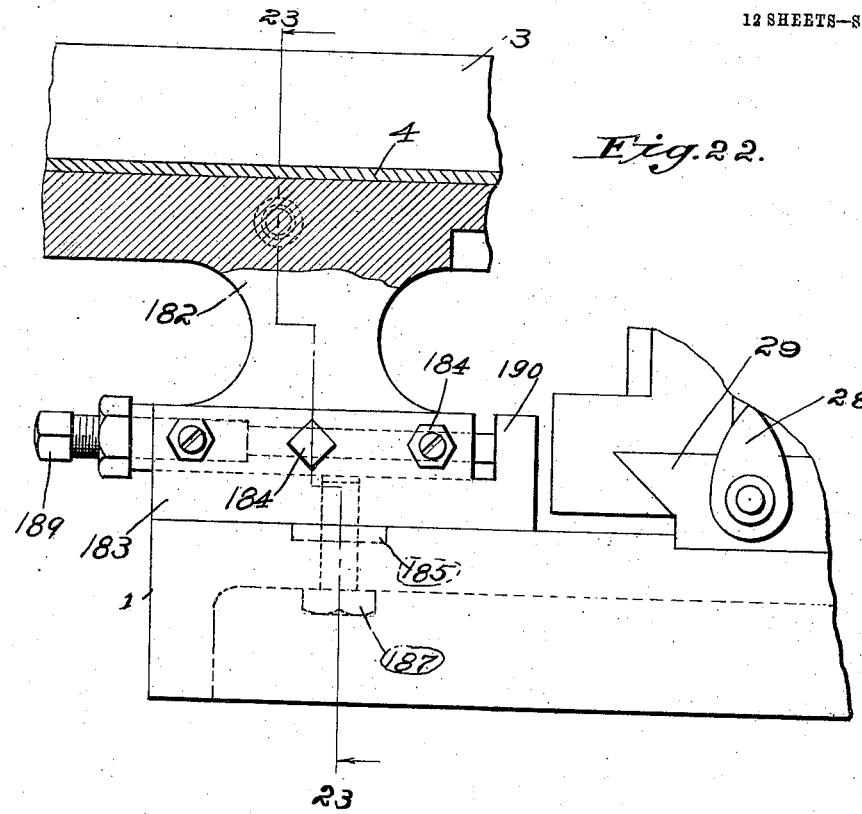
Figure 23:
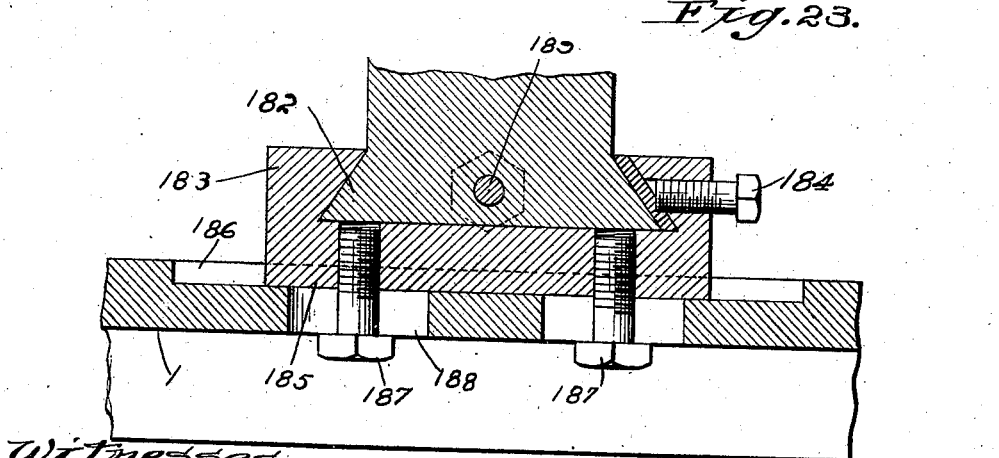

In the said drawings, Figure 1 is a side elevation of my improved machine. Fig. 2 is a side elevation of the opposite side thereof to that presented in Fig. 1. Fig. 3 is a plan view with the driving-pulleys cut off. Fig. 4 is a vertical longitudinal sectional view taken on the line 4 4, Fig. 3. Fig. 5 is a vertical transverse section taken on the line 5 5, Fig. 3. Fig. 6 is an end elevation looking from the right in Fig. 3. Fig. 7 is a detail plan view of the two cutters showing their relation to a needle. Fig. 8 is a plan section taken on the line 8 8, Fig. 4. Fig. 9 is a plan section taken on the line 9 9, Fig. 4. Fig. 9$^a$ is an enlarged longitudinal section of the needle. Fig. 10 is a detail transverse section on the line 10 10, Fig. 9. Fig. 11 is a detail vertical section taken on the line 11 11, Figs. 2 and 8. Fig. 12 is an enlarged end elevation of the needle-jaw mechanism looking from the right in Fig. 8. Fig. 13 is a vertical longitudinal section thereof taken on the line 13 13, Fig. 12. Fig. 14 is an enlarged plan view of the needle-jaw mechanism, showing the jaws open. Figs. 15, 16, 16$^a$, and 17 are similar views, on a smaller scale, showing the needle-jaw mechanism in the different stages of its operation, as will be hereinafter described. Fig. 18 is a vertical transverse section taken through the needle box or hopper on the line 18 18, Fig. 8. Fig. 19 is an enlarged longitudinal sectional view thereof on the line 19 19, Fig. 3. Fig. 20 is an enlarged plan view of the cam-drum and cams, also showing some of the operating-levers in full in dotted lines. Fig. 21 is a detail face view of the worm-wheel and cams thereon for actuating the needle-feeding plunger. Fig. 22 is a side elevation, partly broken away and partly in section, of a modified form of means for supporting and adjusting the needle-feed box or hopper; and Fig. 23 is a transverse section thereof on line 23 23, Fig. 22.

The superstructure of the apparatus is mounted upon a suitable base-plate 1, which may be supported in any suitable way, as by legs 2. The needles to be grooved are placed in a hopper or box 3, transversely of a horizontal feeding-plunger 4, with their points all in the same direction. This plunger 4 has a longitudinal movement at certain times and extends substantially throughout the entire length of the hopper 3 and serves to push the needles one at a time into a duct or chute 5, extending downwardly from one end and corner of the hopper.

In the operation of the machine the movement of the plunger 4 is such as to keep this chute 5 full of needles from top to bottom; but the needles are prevented from falling through the lower end of the chute 5 by a needle-ledge 6, consisting of a thin plate arranged horizontally at the lower end of the chute 5 and having its extremity slightly bent or grooved in an upward direction, so as to support the needles. (See Fig. 19.) The inner end of this needle-support 6 is secured to a slide or plate 7, which is held in place in a suitable recess 8 in the bottom of hopper 3 by means of a screw or stud 9, passing through a slot 10 in the slide 7. The slide is pressed outwardly by a spring 11, socketed in the inner end of the slide and bearing against the inner end of the recess 8, so that when not otherwise restrained the ledge 6 will project outwardly and support the needles in the chute 5. It is pulled inwardly to allow the lowermost needle to fall, however, at the proper time, by a cam or incline 12, secured to a sliding carriage 13 and arranged to engage a pin or lug 14, projecting downwardly from the slide 7. In this exemplification of the invention the incline 12 is formed on a plate 15, which is secured adjustably by screw 16 and slot 17 (see Fig. 18) directly to the side of a block 18, which is mounted on the carriage 13 and secured thereto for supporting the fixed one 19 of two jaws, which serve to grasp the needle and first insert it between the cutters, as will be hereinafter described, and then remove it from the cutters after the cutting operation is complete. The pivoted one of these jaws is shown at 20 and it is likewise secured to a block 21, similar to the block 18, mounted upon the carriage 13. The jaw 19 is formed on a plate 22, secured to block 18 in any suitable way, as by screws 23, and the jaw 20 is formed on a similar plate 24, which is pivoted to its block 21 by a screw or pivot 25 and constitutes a lever for operating the jaw 20. A portion of the plate 22 projects over the edge of block 18 and is formed with a longitudinal groove 26, into which the lowermost needle falls and rests after it is released by the needle-support 6, and directly under this groove 26, at a position between the two blocks 18 21, is arranged a fixed needle-supporting bar or tongue 27, which is rigidly secured against movement with the carriage 13 in any suitable way, as by means of a supporting-bracket 28, secured to the end of a fixed way 29, on which the carriage 13 is dovetailed and slides, the upper end of bracket 28 being attached to bar 27 by screw 30, or other suitable means, so that when the carriage 13 recedes outwardly a certain distance the needle, which is resting in the groove 26, will be finally supported upon the end of the bar 27 with the butt or large end thereof directly between the two jaws 19 20, which come together over the upper edge of the bar 27 at that time, the needle being prevented from receding with the plate 22 and the jaws 19 20 by coming into engagement with downwardly-projecting end wall 31 (see Fig. 18) of the chute 5. When the carriage 13 makes its return movement, the incline 12 strikes the pin 14 and again withdraws the needle-support 6, allowing another needle to fall into the groove 26 of plate 22, which by this time is projected under the entire length of the chute 5.

The pivoted jaw 20 is pressed continually toward its companion jaw 19 by suitable means, as a spring 32, secured at one end by screw 33 or other means to the side of block 21 and having its other end inserted behind a lug 34, projecting downwardly from plate 24, so that when not otherwise restrained jaw 20 will close toward jaw 19. Jaw 20 is held open, however, while the carriage 13 is receding toward the right, as viewed in Fig. 15, and until the groove 26 of plate 22 has passed out from under the butt of the needle and the latter has dropped upon the needle-supporting bar 27 by a tumbler 35, secured by a pivot 36 to a supporting-bracket 37 and so arranged as to engage the outer edge of the pivoted plate 24 and hold the jaw open, as described. This tumbler 35 is in the form of a triangle with its apex rounded where it bears against the edge of bar 24, and one of the base-corners rounded at 35$^a$ to allow the tumbler to turn on its pivot in one direction without interference from a shoulder 38, formed on the bracket 37, while the pointed corner prevents the tumbler from turning on its pivot in the opposite direction by coming against said shoulder. This flat side of the tumbler is held normally against said shoulder by a spring 39, secured at one end to the bracket and at its other end to an upwardly-projecting pin 40 on one corner of the tumbler. Consequently, so long as the plate 24 is moving toward the right, as viewed in Fig. 15, the rounded apex of the triangular tumbler 35 will be held in contact with the edge of plate 24, and therefore the jaw 20 will be held away from the jaw 19; but the instant the movement of the carriage 13 reverses the frictional contact of plate 24 against tumbler 35 will cause the tumbler to turn on its pivot and present its flat side to the edge of the plate 24, whereupon the predominating pressure of spring 32 will overcome the resistance of spring 39 and throw the tumbler a quarter-turn, with its straight edge resting squarely against the edge of plate 24, as shown in Fig. 17, thereby allowing the spring 32 to force the jaws together upon the butt-end of the needle. The tumbler 35 remains in this position, with its flat side against the edge of plate 24, while the carriage 13 is traveling toward the left with the needle firmly gripped between the jaws until an incline 41 in the outer edge of plate 24 reaches a point opposite the center of the tumbler 35, whereupon the recoil action of spring 39 will pull the tumbler 35 back to its former position, with its rounded apex projecting toward incline 41 and its straight edge against the shoulder 38. At this time the point of the needle will be fairly between a pair of jaws 42 43, grooved longitudinally along their opposing edges for receiving the needle, and which jaws hold it while the rotary cutters 44 45, arranged in a horizontal plane on opposite sides of the jaws 42 43, enter between the edges of the jaws and produce the groove in the needle, as will be presently described more fully. The travel of the carriage 13 toward the left, however, as viewed in Figs. 2, 14, and 15 to 17, inclusive, does not cease at this juncture; but the tumbler 35 from this time on ceases to have any effect upon the plate 24, inasmuch as the plate 24 from the incline 41 is cut away on the dotted line 45 to the outer extremity or right-hand end of said plate; but the continued movement of plate 24 toward the left brings an incline 46 into engagement with a second tumbler 47, arranged over the tumbler 35 and pivoted on the same pivot 36, and being identical in form with the tumbler 45 excepting that its rounded corner 47$^a$ at the base of the triangle is on the reverse side to that of the rounded corner 35$^a$, so that when the two triangular tumblers are in the position shown in Fig. 14, with both of their rounded apexes turned toward the plate 24 and the straight portions of their bases resting against the shoulder 38 they will form in plan view a perfect triangle, excepting that their apexes are rounded. Hence, while the tumbler 35 requires frictional movement against its apex toward the left in order to tumble it into position shown in Fig. 17 the tumbler 47 requires frictional movement against its rounded apex in the opposite direction or toward the right in order to tumble its straight edge away from the shoulder 38 with its flat side toward the bar 24. Therefore as the carriage 13 continues to move toward the left, as viewed in Figs. 8, 14 to 17, inclusive, the jaw 20 will be opened by the incline 46, engaging the point or rounded apex of tumbler 47, and it will be held open as long as the carriage 13 moves toward the left and, in fact, until it has moved far enough in that direction to bring a second incline 48 opposite the point of tumbler 47, these two inclines 46 48 being formed on a plate 49, secured on the upper face of plate 24, at the outer end thereof, so as to be in a plane above the tumbler 35 and plate 24. After the jaws 19 20 release their grip on the needle the needle is pushed still farther between the cutter-jaws 42 43 by a shoulder 50, formed on the end of that portion of plate 22 in which the groove 26 is formed if the needle should not have been advanced a sufficient distance into the cutter-jaws while within the grip of the jaws 19 20.

After the needle has thus been properly positioned between the cutter-jaws 42 43 the latter jaws are caused to close upon and grip the needle and to then begin their excursion past the cutters 44 45, carrying the needle with them a distance equal to the length of the groove to be produced. The mechanism for thus actuating the cutter-jaws 42 43 will be presently described. When the jaws 42 43 begin their receding movement, the movement of carriage 13 toward the left ceases and the jaws 19 20 remain open, as shown in Fig. 14, by reason of the apex of tumbler 47 resting against a straight edge 51 on plate 49; but by the time the cutting action is completed and the force which presses jaws 42 43 against the needle is relieved the carriage 13 makes a further movement toward the left, as viewed in Fig. 14, until the jaws 19 20 overlap the butt-end of the needle held between the jaws 42 43, and by the time they reach that position the incline 48 comes opposite the point of tumbler 47 and permits the predominating force of the spring 32, acting through the agency of said incline 48, to turn the tumbler 47 on its pivot and bring the flat side thereof squarely against the incline 48, overcoming the resistance of a spring 52, secured at one end to bracket 37 and at the other end to a pin 53 on the side of tumbler 47 near its point, thus throwing tumbler 47 into the position shown at Fig. 15 and permitting the spring 32 to close the jaws 19 20 upon the end of the needle. At this juncture the travel of carriage 13 reverses, taking the opposite direction of movement, or toward the right, as viewed in Fig. 15, and continues this receding movement until the incline 46 again comes opposite the point of tumbler 47, whereupon tumbler 47 will be thrown back to its former position with its rounded apex presented toward the inner end of incline 46, as shown in Fig. 16, in readiness to repeat its described operation when the incline 46 again meets it, the tumbler 35 being also in its normal position, as shown in Figs. 15, 16, in readiness to be engaged by the incline 41 as the carriage 13 continues to move toward the right, and by thus pressing the plate 24 inwardly throws open the jaw 20 and permits the grooved needle to drop out through a suitable aperture 54, formed through the way 29, this taking place at about the time the jaws 19 20 reach the end of the needle-support 27, which, if desired, may be provided on its upper side with a small projection 55 in the form of a spring deflectable downwardly, so as to permit the plate 22 to pass over it, but to spring upwardly as soon as released by said plate, and by thus jogging the needle, causing it to be dislodged from the jaws 19 20 in case it should adhere thereto by reason of the presence of any grease thereon or for any other cause, the ejector 55, however, being located to one side of the center of groove 26, so as not to engage the point or smaller end of the needle and possibly prevent its proper introduction into the cutter-jaws 42 43. The carriage 13 thus continues its receding travel toward the right until the plate 22 passes from under the needle, which is confined in the chute 5, against the end wall 31 and is pushed out of the groove 26 in said plate 22 by said end wall and falls upon the inside supporting-bar 27 with its butt-end directly between the open jaws 19 20, the needle-support 6 having in the meanwhile been withdrawn to permit the needle to fall into groove 26 by the movement toward the left of incline 12 when the carriage 13 started on its described excursion toward the cutter-jaws 42 43 in moving toward the left, the groove 26 in plate 22 being of a sufficient length to remain under and support the needle while the carriage completes this left-hand movement. While the carriage 13 is receding toward the right with the grooved needle in the described manner, the cutter-jaws 42 43 are following it up to regain their former position for receiving the next needle, and by the time the jaws 19 20 open to release the grooved needle and the cutter-jaws 42 43 have regained their original position the movement of the carriage 13 again reverses toward the left, Fig. 14, and hence the friction of the straight edge of plate 24 against the rounded apex of tumbler 35, which is then in the position shown in Fig. 16ª, causes said tumbler to turn around until the predominating force of spring 32 throws its flat side outwardly against the edge of plate 24, as shown in Fig. 17, overcoming the resistance of the spring 39 and closing the jaw 20 against the needle. From this point on the operation of the described parts up to the time the jaws 19 20 introduce the needle between the cutter-jaws 42 43 in moving toward the left remain at rest until the cutter-jaws 42 43 have receded with the needle to the end of the cutting operation and finally continue their excursion toward the left for again gripping the needle and taking it away from the cutter-jaws 42 43 has already been described, and the instrumentalities which produce these periodic movements of the carriage 13 and the cutter-jaws 42 43 will now be explained.

The slot or aperture 54, through which the needles fall, is continued longitudinally of the way 29 a distance equal to the travel of the carriage 13, so as to provide for the movement of a connecting-lug 56, by which the carriage 13 is secured to one end of a longitudinal operating-rod 57, which is pivotally connected to the lug 56 and has its other end pivotally connected to a horizontal bell-crank or other suitable lever comprising two arms 58 59, the former of which is pivotally connected to the rod 57, while the latter is provided with an antifriction-roller 59ª or other equivalent means projecting upwardly through the base-plate 1, on which the lever 58 59 is pivoted, where it is engaged by a series of cams 61 62 63, secured circumferentially on a cam-drum 64. This drum 64 is journaled in any suitable bearings 65 66, supported on the base-plate 1 and has one of its journals 67 continued outwardly and provided with means of proper rotation—such, for example, as a worm-wheel 68—meshing with an upright worm 69, journaled in suitable brackets 70 71 and provided with a pulley 72 for causing the cam-drum 64 to rotate in the direction of the arrows in Figs. 3, 9, and 20, but the speed of rotation is very slow as compared with that of the pulley 72.

Assuming the parts to be in position shown in Fig. 16ª, with the carriage 13 in readiness to start toward the left, the point of cam 61 would be about in readiness to engage the antifriction-roller 59ª; but the drum 64 at that time would be a half-turn farther around than the position shown in Fig. 20. Thus it will be seen that as the cam 61 pushes the roller 59ª toward the right, as viewed in Fig. 20 it throws the arm 58 outwardly, and consequently pulls rod 57 toward the left as viewed in Figs. 3, 4, and 8 and moves the carriage 13 and connected parts in the same direction as viewed in Figs. 14, 15 to 17, inclusive, thus imparting to the carriage 13 the requisite movement for causing the jaws 19 20 to close upon the needle and force the needle between the cutter-jaws 42 43, and when the straight portion 61ª of cam 61, which straight portion 61ª is considerably elongated, reaches the roller 59ª the carriage 13 remains at rest, while the cutter-jaws 42 43 close together on the needle and recede from the jaws 19 20 to carry the needle past the cutters, as before described. By the time the incline surface of cam 62 arrives at and engages the roller 59ª, however, the carriage 13 will be given a further movement toward the cutter-jaws 42 43, or toward the left, in order to carry the jaws 19 20 to the needle for gripping it preparatory to taking the needle away from the cutter-jaws 42 43, as before described, and the cam 62 is provided with an inactive portion or straight edge 62ª, which permits the carriage to remain at rest at the full limit of its left-hand or inward stroke to afford time for the cutters to withdraw, as will be presently described, and by the time this has taken place the cam 63 engages the roller 59ª on the opposite side and moves the arm 58 inwardly, and consequently causes the carriage 13 to repeatedly recede or move outwardly, with the needle between the needle-jaws 19 20, which automatically close together on the needle the instant the movement of the carriage reverses, as before described. The incline of cam 63, it will be seen, runs to a point directly opposite the forward end of cam 61, which is inclined in a direction opposite that of incline 63, and consequently carriage 13 no sooner arrives at the limit of its outward stroke than the point of cam 61 engages roller 59ª and by thus throwing arm 58 outwardly immediately causes the movement of the carriage 13 to reverse or start back toward the cutter-jaws 42 43 for inserting another needle, the reversal of the carriage automatically closing the needle-jaws 19 20 upon the new needle, as before described, and so on around the cycle of cams 61ª, 62, and 63. In order that the position of the carriage 13 with relation to the cams 61ª 62 63 may be varied to a nicety, the rod 57 is provided with a turnbuckle 57ª.

The needle-feeding plunger 4 is operated from any suitable connection with the moving parts of the machine—such, for example, as one or more cams or inclines 73 74, formed in a groove 75 in the inner face of worm-wheel 68 and adapted to strike a lug 76, projecting from the side of the supporting-arm 77, which is pivoted to the side of bearing 66, and against this arm 77 is socketed one end of a push-rod 78, whose other end is secured to a slide 79, (see Fig. 2,) having an incline or cam 80 arranged to engage a lug 81, projecting downwardly from the lower side of the plunger 4, which extends through the back end of the hopper 3, the slide 79 being supported on the support 82 of the hopper by two studs or screws 83, which pass through slots 84 in the slide 79, and the slide is pulled continually in one direction by a spring 85, secured thereto, so as to keep the end of the push-rod 78 in contact with the support 77. Thus it will be seen that each time one of the cams 73 74 passes the lug 76 the rod 77 will be pushed toward lug 81, and the incline 80 (see Fig. 8) will serve to pull the plunger 4 outwardly. It will be forced inward as soon as incline 81 is withdrawn by any suitable spring 86, (see Figs. 2, 3, and 6,) secured to the outer end thereof, thus feeding the needles by the action of the spring 86 and allowing the plunger to yield in the event the needles should become jammed in front of it.

The means for imparting the described closing action to the cutter-jaws 42 43 and causing them to recede with the needle past the cutters 44 45 will now be described. These jaws 42 43 are mounted upon a sliding carriage 87, (see Figs. 4, 5, and 8,) which in turn is mounted upon the inner end of the guideway 29 and is attached by pivot 88 to one end of a connecting-rod 89, whose other end is connected to one arm 90 of a bell-crank lever pivoted at 91 to base-plate 1 and having its other arm 92 provided with an antifriction-roller or lug 93, the connection between rod 89 and arm 90 being preferably effected by a swivel-nut 94, which permits the rod 89 to be adjusted with relation to arm 90, while allowing for the oscillation of the rod and the arm. The antifriction-roller or lug 93 is arranged to be engaged at the proper time by a cam 95, which is secured to the periphery of drum 64 and is considerably elongated, as appears in Fig. 20, so as to produce the relatively slow movement of the carriage 87 by deflecting the arm 92 toward the right as appears in Fig. 20. The point of cam 95 reaches lug 93 and begins this deflection at about the time the carriage 13 completes its first inward or advancing movement with the needle, the jaw 42 having in the meanwhile firmly gripped the needle upon its companion jaw 43, so as to advance the needle slowly past the rotary cutters. Before this movement of the carriage 87 begins, however, the jaw 42, which is mounted on one end of a lever 96, pivoted in standards 97 on carriage 87, is forced downwardly against the needle by the upward oscillation of the opposite end of lever 96, which is provided with a suitable support upon a transverse lever 98, pivoted at 99 to carriage 87 and having an incline or cam 100 formed on the under side thereof in position to be engaged by a horizontally-deflectable lever 101, (see Fig. 11,) this aforesaid support for the lever 96 preferably consisting of a set-screw 102, so that the relative positions of levers 96 98 may be varied with great nicety. When lever 101 moves in one direction, engaging cam or incline 100, it lifts lever 98 and depresses jaw 42 against the needle-jaw 43, rigidly fixed to carriage 87, and when lever 101 moves in the opposite direction it releases lever 98, permitting the predominating weight of the inner end of lever 96 to lift jaw 42 away from the needle. This periodic deflection of lever 101, which may be pivotally supported upon carriage 87 by a screw or pivot 103, is produced by a cam on cam-drum 64 engaging a lug or antifriction-roller 104 on the free extremity of lever 101, the said cam being shown at 105 in Fig. 20, and serving to deflect the lever 101 toward the left as viewed in said Fig. 105ª, being a release-cam, which acts on the opposite side of roller 104 immediately the cutters are withdrawn from the work. When the cam moves the lever 101 far enough to engage under the incline 100, it is retained under the incline by the frictional contact between incline 100 and lever 98, so as to maintain the grip upon the needle until the cutting operation is completed, and when a cut-away portion 106 of the cam 105 reaches the lug or antifriction-roller 104 the lever 101 is pulled in the opposite direction by a spring 107 to allow the jaw 42 to release the needle, if a needle is between the jaws, or to rise out of the way of the cutters and prevent damage to the latter if the needle be absent. This action of the cutter-jaw takes place when the summit of cam 95 passes the antifriction-roller 93 and the inward or receding travel of the cutter-jaws 42 43 ceases, and at which time the needle-jaws 19 20 make the second stage of the inward or advancing stroke to again take possession of the needle, as before described. As the needle-jaws perform this action and start back with the grooved needle another cam 108 on drum 64 engages antifriction-roller 93 on the other side and deflects toward the right as viewed in Fig. 20, thereby pushing rod 89 inwardly and returning carriage 87 with the cutter-jaws 42 43 thereon to its former position, which the cutter-jaws occupy when the needle is introduced between them by the needle-jaws 19 20, as before described, and where said cutter-jaws 42 43 remain until the needle-jaws 19 20 have withdrawn to the full limit of their outward stroke, dropping the grooved needle in receding and bringing back another needle and introducing it between the cutter-jaws at the completion of the first stage of their inward or advancing stroke.

If desired, a gage may be provided for guarding against the new needle being introduced too far between the cutter-jaws. This gage may consist of a horizontal pin 109, supported between the jaws 42 43 at their inner ends by any suitable standard or support 110, mounted on carriage 87 and so arranged as to be engaged by the point of the needle and arrest further inward movement of the needle in the event it should be necessary, the needle-jaws 19 20 being capable of allowing the needle to slip should it thus engage the gage 109.

The rotary cutters 44 45 are mounted in the usual or any suitable way upon the lower ends of two perpendicular parallel shafts or spindles 110 111, which are independently journaled in two slides 112 113, respectively, and are geared together by suitable gears 114 115, one of the spindles, the spindle 110, being provided with a pulley 116, by which it may be connected to any suitable source of power, and another pulley 117, by which motion may be transmitted through the intermediary of a suitable belt 118 or other means to the pulley 72, which drives the cam-drum 64. The slides 112 113 are vertically adjustable on two additional slides 119 120, respectively, which latter are provided with dovetail connections 121 122 with the slides 112 113, respectively, and the latter slides are provided, respectively, with overhanging lugs 123 124, carrying set-screws 125, by which the upward movement or adjustment of the slides 112 113 may be effected, and with similar lugs 126 127, projecting under the lower ends of dovetails 121 122 and carrying set-screws 128, by which the slides 112 113 may be adjusted downwardly and held in position, thereby providing for the nice adjustment of the cutters 44 45 not only with relation to each other, but to the jaws 42 43.

The slides 119 120 are movable horizontally or at right angles to the line of adjustment to the slides 112 113, and these slides 119 120 have dovetail or other suitable connection 129 with a guideway 130, extending horizontally across the face of a plate 131, which is mounted on suitable standards 132 133, (see Figs. 1, 2, 3, 4, 9, and 11,) said way being in the form of a dovetail, as shown in Fig. 4, and extending entirely across the machine, so as to serve for both of the slides 119 120. The purpose of moving the slides 119 120 is to carry the cutters 44 45 into or out of the needle, more or less, as required by the character and depth of the groove to be formed, and this movement is produced by means which will now be described.

As more clearly shown in Figs. 9 and 10, the horizontal bar or plate 131 is provided at the back of each of the slides 119 120 with a recess 134, and in these recesses are pivoted, respectively, two levers 135 136 on pins 137. Both levers are shown in plan in Fig. 9 and one of them in vertical section in Fig. 10. They are the same in construction, and their means of connection with the slides 19 20, however, and hence the description of the construction of the one shown in Fig. 10, will suffice for both. The end of each of these levers, it will be seen, is provided with a slot or notch 138, from which projects a pin or lug 139, extending downwardly through each of the slides 119 120, so that as the levers 135 136 are oscillated in an inward direction the slides will be moved outwardly for carrying the cutters away from the needle and when oscillated in an outward direction the cutters will be forced into the needle.

In order to avoid the possibility of damage to the cutters and to the needle, I prefer to produce their inward movement by a yielding means and to provide a positive rigid stop for absolutely limiting this inward movement. On the outer end of the slide 119 is formed or secured a lug 140, in which is mounted an adjustable stop in the form of an adjusting-screw 141, having a lock-nut 142 and adapted to come against one end of the bar 131. Hence by the manipulation of this screw 141 the position of cutter 44 may be gaged to a nicety and its inward movement, or movement toward the needle, absolutely limited. The outward movement of this cutter 44 may be produced in any suitable way, as by a spring 143, secured at one end to the lever 136 and at the other end to a standard 144, while the inward movement of cutter 44 is produced by a cam 145, secured to cam-drum 64, the cam 45 being given a shape complementary to that of the groove to be formed in this side of the needle by said cutter, as will readily be understood, the lever 136 being provided on the under side with an antifriction-roller or lug 146, which is engaged at the proper time by cam 145. This machine is more especially designed for grooving sewing-machine needles of that character in which one side is simply grooved at a short distance where the eye is situated, while the other side is grooved throughout a considerable part of its length with a groove which is shallow where the eye is situated and deeper at a point upward from or behind the eye, as shown in Fig. 9ᵃ, 147 being the short groove on one side and 148 149 being the shallow groove and the deep groove, respectively, on the other side. The cutter 44 and cam 145 are for producing the short groove 147, and the length of this groove will of course be dependent upon the length of cam 145.

On the end of the other slide 120 is formed or secured a lug 150, and in this lug is screwed a stop 151, which limits the inward movement of slide 120 and gages the depth of cut of the cutter 45. The slide 119 may be forced up to its work by the cam 145 or by the spring 143, but preferably by the cam, in order to produce the abrupt cut 147. The slide 120, however, is preferably forced into the work by means of a spring 152, secured at one end to lever 135 and at the other end to the standard 144, and it is forced away from the work by a cam 153 on drum 64, which is so formed as to produce the groove of proper length and depth. At the commencement of the shallow groove 148, however, the stop 151 rests against a high part 154 of a cam-lever 155, (see Fig. 5,) and which high part 154 moves away from stop 151 by the time the point in the length of the needle where the deep groove 145 commences is reached, thus permitting the spring 152 to force the cutter 45 farther into the work, the stop 151 then resting against the low part 156 of the lever 155. The point of the stop 151 is beveled, as shown at 157, to better adapt it for the engagement and release of the incline which connects the high and low parts 154 156 of lever 155, and which incline may be of greater or less angle, according to the pitch of the groove where it runs from the shallow to the deeper part. The lever 155 is pivoted at 158 to the end of bar 131 and is provided at its free end with an antifriction-roller or lug 159, arranged in the path of a cam 160 (see Fig. 1) on the end of drum 64, so as to engage lug 159 and carry the high part 157 of the lever away from the stop 151, the cam 160 being so positioned with relation to the cams before described on the drum as to engage and lift the lever 155 by the time the end of the shallow groove 148 is reached.

As a means of locking the stop 151 to its adjustment, a lock-nut 161 is provided, and as an additional safeguard a set-screw 162 may be employed for impinging it on the side.

The lever 136 136ᵃ is composed of two arms, as shown more clearly in Figs. 2 and 9, the arm 136 being pivoted to the lower arm 136ᵃ by a pivot 163, and the end of the arm 136 is provided with a notch 164 and a slit 165, and in the notch 164 is located a stud 166, which holds the arm 136 from turning on the pivot 163, excepting in so far as the elasticity of the slotted end of the arm will permit, and consequently the arm 136 will yield, if necessary, when the cutter reaches the needle. In order that the arm 136 may be adjusted relatively to arm 136ᵃ, the stud 166 is pivoted eccentrically, as indicated in Fig. 9, the pivot end thereof being carried through the arm 136ᵃ and secured by a nut 167, as indicated in Fig. 2, so that by turning the stud 166, the nut being first loosened, the necessary adjustment of arm 136 may be effected and the roller 146 thereby caused to engage with the cam 145 at an earlier or later period, as may be necessary.

If desired, the lever 135 135ᵃ may also be composed of two arms, the upper one of which is referred to by the character 135 and the lower one by 135ᵃ, and these two arms may be similarly pivoted and connected, 168 being the pivot, 169 the notch in the arm 135, 170 the slit corresponding to slit 165, and 171 the eccentric stud like the stud 166, 172, Fig. 4, being the nut which holds stud 171 in place. Thus by turning stud 171 roller 146 may be adjusted with relation to the cams on drum 64, which engage therewith, and consequently the cams may be caused to engage sooner or later, as required, and the length of the groove in the needle thereby varied, it being remembered that the cams serve to move the cutters out of the work.

Thus it will be seen that during the cutting operation the cams acting on the arm or lever 135 135ᵃ, which operates the cutter for cutting the long groove, are relieved of the wear incident to holding the cutters into the work, the only wear on the cams being that which is occasioned by throwing the cutter out of the work, and as it is much easier and cheaper to adjust the lever-arms which actuates the cutter than it is to renew the cams this method is seen to possess obvious advantages.

173 is a latch or button pivoted by a screw 174 to the end of guide 131 for limiting the outward movement of the slide 119 and preventing the gears 114 115 from coming out of mesh. This button has a shoulder 175, which rests against the back of slide 119 and holds the button in a horizontal position, as shown in Fig. 2, overlapping the end of the slide, the lower portion of shoulder 175 being rounded, so that the button may be turned upwardly when desired to pull the slide out for removing the cutters.

It is desirable that the feed-box or hopper 3, Fig. 19, be adjustable longitudinally for bringing the chute 5 accurately over the needle-groove 26 and adjustable transversely— that is, longitudinally—of the groove 26, causing the needle to be deposited at the proper place, it being understood that as the cams which move the carriage 13 and the parts which actuate the needle-support 6 wear away the point at which the needle is deposited from the chute 5 will vary, and it is found to be more convenient and economical to adjust the hopper or feed-box 3 to compensate for this variation than it is to adjust or renew the other mechanism. As shown in Fig. 19, the feed-box 3 is supported on a pedestal 176, which is provided with a foot 177, connected to the base 1 by set-screws 178, passing through slots 179 (see Figs. 8, 19 in foot-piece 177, so that the box 3 may be adjusted longitudinally of groove 26. The adjustment transversely of groove 26 may be produced by an adjusting-screw 180, threaded in a lug 181 on foot-piece 177 and impinging base 1.

In the modification shown in Figs. 22, 23, which is the preferable form, the feed-box 3 is formed with a dovetailed pedestal 182, fitted to slide in a slide 183 and rigidly held to its adjustment in this slide by set-screws 184. The slide itself has a tongue 185, arranged in a groove 186 in base 1, so that the slide may travel transversely of the line of movement of dovetailed foot 182. The slide is adjustably secured to base 1 by set-screws 187, passing through slots 188 in base 1, so that the adjustment of the box longitudinally of groove 26 may be produced. The adjustment transversely of groove 26 is produced by an adjusting-screw 189, passing through foot 182 and impinging a flange 190 on slide 183.

Having thus described my invention, what I claim as new therein, and desire to secure by Letters Patent, is—

1. In a needle-grooving machine, the combination with means for cutting the groove, means for carrying the needle toward and from said cutting means comprising two needle-jaws one of which is movable with relation to the other, and means for moving said movable jaw in one direction with relation to the other, of a pivoted tumbler and means with which said tumbler engages whereby the bodily movement of said jaws causes said tumbler to tumble and crowd said movable jaw in the opposite direction with relation to its companion jaw.

2. In a needle-grooving machine, the combination with means for cutting the groove, means for carrying the needle toward and from said cutting means comprising two needle-jaws one of which is movable with relation to the other, and means for moving said movable jaw in one direction with relation to the other, of a pivoted tumbler provided with an active and an inactive face and means with which said active face engages whereby the bodily movement of said jaws causes said tumbler to move about its pivot to cause the active face to crowd said movable jaw in the opposite direction with relation to its companion jaw.

3. In a needle-grooving machine, the combination with means for cutting the groove, means for carrying the needle toward and from said cutting means comprising two needle-jaws one of which is movable with relation to the other, and means for moving said movable jaw in one direction with relation to the other, of a pivoted tumbler, means with which said tumbler engages whereby the bodily movement of said jaws causes said tumbler to oscillate and crowd said movable jaw in the opposite direction with relation to its companion jaw, a stop for limiting the pivotal movement of said tumbler and yielding means for returning said tumbler against said stop.

4. In a needle-grooving machine, the combination with means for cutting the groove, means for carrying the needle toward and from said cutting means comprising two needle-jaws one of which is movable with relation to the other, a pivoted tumbler provided with an active and an inactive face, means with which said active face engages comprising an incline, whereby the bodily movement of said jaws causes said active face to crowd said movable jaw in one direction with relation to its companion jaw, means for moving said movable jaw in the opposite direction, and means for causing the inactive face of the tumbler to stand adjacent the jaw to permit the last said means to move the jaw.

5. In a needle-grooving machine, the combination with means for cutting the groove, means for carrying the needle toward and from said cutting means comprising two needle-jaws one of which is movable with relation to the other, and means for moving said movable jaw in one direction with relation to the other, of a pivoted tumbler stationary with relation to said jaws and means with which said tumbler engages movable bodily with said jaws whereby the bodily movement of said jaws causes said tumbler to oscillate and crowd said movable jaw in the opposite direction with relation to its companion jaw.

6. In a needle-grooving machine, the combination with means for cutting the groove, means for carrying the needle toward and from said cutting means comprising two bodily-movable needle-jaws one of which is movable with relation to the other, and means for moving said movable jaw in one direction with relation to the other, of two pivoted oppositely-rotatable tumblers stationary with relation to the jaws, and means engaging with the tumblers for crowding the movable jaw in the opposite direction with relation to its companion jaw when the jaws undergo bodily movement.

7. In a needle-grooving machine, the combination with means for cutting the groove, means for carrying the needle toward and from said cutting means comprising two needle-jaws one of which is movable with relation to the other, and means for moving said movable jaw in one direction with relation to the other, of two pivoted oppositely-rotatable tumblers and means comprising two inclines engaging therewith for crowding the movable jaw in the opposite direction with relation to its companion jaw when the jaws undergo bodily movement.

8. In a needle-grooving machine, the combination with means for cutting the groove, means for carrying the needle toward and from said cutting means comprising two needle-jaws one of which is movable with relation to the other, and means for moving said movable jaw in one direction with relation to the other, of two pivoted oppositely-rotatable tumblers arranged in different planes, and means comprising two inclines arranged in different planes, engaging therewith for crowding the movable jaw in the opposite direction with relation to its companion jaw when the jaws undergo bodily movement.

9. In a needle-grooving machine, the combination with means for cutting the groove, means for carrying the needle toward and from said cutting means comprising two needle-jaws one of which is movable with relation to the other, and means for moving said movable jaw in one direction with relation to the other, of an operating-lever for said movable jaw and a pivoted tumbler engaging said lever for deflecting it when the lever moves bodily in one direction with the jaws.

10. In a needle-grooving machine, the combination with means for cutting the groove, means for carrying the needle toward and from said cutting means comprising two needle-jaws one of which is movable with relation to the other, and means for moving said movable jaw in one direction with relation to the other, of an operating-lever for said movable jaw having an incline, a double incline also carried by said lever and arranged in a different plane from said first incline, and two pivoted oppositely-rotatable tumblers stationary with relation to said lever and adapted to engage said inclines respectively for moving said movable jaw with relation to its companion jaw at different periods during the bodily travel of the jaws.

11. In a needle-grooving machine, the combination with means for cutting the groove, means for carrying the needle toward and from said cutting means comprising two needle-jaws one of which is movable with relation to the other, and means for moving said movable jaw in one direction with relation to the other, of a pivoted triangular tumbler having one corner rounded, a bracket to which said tumbler is pivoted having a stop against which one corner of the tumbler abuts but which stop said rounded corner passes, and means engaging said tumbler whereby the bodily travel of the jaws moves the movable jaw in the opposite direction with relation to its companion jaw.

12. In a needle-grooving machine, the combination with means for cutting the groove, means for carrying the needle toward and from said cutting means comprising two needle-jaws one of which is movable with relation to the other, and means for moving said movable jaw in one direction with relation to the other, of a pivoted triangular tumbler having one corner rounded, means for limiting the pivotal movement of said tumbler in one direction and means engaging with said rounded corner of the tumbler whereby the tumbler is caused to rotate when the jaws move bodily in one direction and to crowd said movable jaw toward its companion jaw when the jaws move bodily in the opposite direction.

13. In a needle-grooving machine, the combination with means for holding the needle, a grooving-cutter movable toward and from said first means and means for moving the cutter away from said first means, of yielding means for moving the cutter toward said first means and a positive stop for limiting the latter said movement.

14. In a needle-grooving machine, the combination with means for holding the needle, a grooving-cutter movable toward and from said first means and means for moving the cutter away from said first means, of yielding means for moving the cutter toward said first means and a positive adjustable stop for limiting the latter said movement.

15. In a needle-grooving machine the combination with means for holding the needle, a grooving-cutter and means for moving one of said means away from the other, of yielding means for moving the movable one of the first two said means toward the other and a positive stop for limiting the latter said movement.

16. In a needle-grooving machine, the combination with means for holding the needle and a grooving-cutter movable toward and from said first means, of a positively-acting cam for moving the cutter away from said first means, yielding means for moving the cutter toward said first means and a positive stop for limiting the latter said movement and gaging the depth of cut.

17. In a needle-grooving machine, the combination with means for holding the needle, a grooving-cutter movable toward and from said first means and means for moving the cutter away from said first means, of yielding means for moving the cutter toward said first means, a positive stop for limiting the latter said movement, a movable member having an irregularity on its face against which said stop bears and means for moving said member with relation to said stop and thereby altering the position of the cutter with relation to said first means.

18. In a needle-grooving machine, the combination with means for holding the needle, a grooving-cutter, and means for moving the cutter away from said first means, of yielding means for moving the cutter toward said first means, a positive stop for limiting the latter said movement, a pivoted lever having a countersink in its face, with which said stop engages and means for oscillating said lever and thereby altering the position of the cutter.

19. In a needle-grooving machine, the combination of needle-grooving means and a carriage movable toward and from said grooving means, of a tongue or needle support fixed with relation to said carriage and adapted to support the needle, needle-jaws one of which is movable with relation to the other, mounted on said carriage, a grooved member movable with said jaws and arranged over said tongue, for receiving the needle, means for engaging the needle and forcing it longitudinally from said groove onto said tongue and means for opening and closing the jaws as the carriage reciprocates.

20. In a needle-grooving machine, the combination with needle-grooving means and a carriage movable toward and from said means, of a tongue or needle-support fixed with relation to said carriage and adapted to support the needle, needle-jaws mounted on said carriage at opposite sides of said tongue, said carriage being provided with a grooved member located over said tongue for receiving the needle, means for engaging the needle and forcing it from said groove longitudinally as the carriage reciprocates, means for closing the jaws upon the needle while resting on said tongue, and a needle-ejector on said tongue for engaging and dislodging the needle.

21. In a needle-grooving machine, the combination with a feed-hopper for the needles having a chute for leading the needles therefrom, a carriage movable under said chute and provided with a grooved member for receiving the needle from said chute, a tongue or needle-support fixed with relation to said carriage and located under said groove, the ends of said chute being extended downwardly for retaining the needle in said groove while said grooved member is under the chute and means for closing the jaws upon the needle when the needle falls from said grooved member upon the tongue as the grooved member recedes from under the needle.

22. In a needle-grooving machine, the combination of means for cutting the groove, means for holding the needle while being cut, a two-part arm for moving said cutting means with relation to said needle-holding means, means yieldingly connecting the parts of said arm together, and a cam acting on one part of said arm for oscillating it.

23. In a needle-grooving machine the combination of means for cutting the groove, means for holding the needle while being cut, a two-part arm for moving said cutting means with relation to said needle-holding means, means yieldingly connecting the parts of said arm together, means whereby the parts of said arm may be relatively adjusted, and a cam acting on one part of said arm for oscillating it.

JOHN O. PETTEY.

Witnesses:
E. E. MANNING,
WILLIS S. BROWN.